United States Patent Office 3,363,027
Patented Jan. 9, 1968

3,363,027
POLYESTERAMIDE PREPARED BY THE REACTION OF A POLYAMIDE WITH AN AROMATIC OXYCARBOXYLIC ACID ESTER
Robert Schnegg, Dormagen, Herbert Pelousek, Dormagen-Horrem, and Robert Dippelhofer, Dormagen, Germany, assignors to Farbenfabriken Bayer Aktiengesellschaft, Leverkusen, Germany, a corporation of Germany
No Drawing. Filed May 7, 1965, Ser. No. 454,188
Claims priority, application Germany, May 13, 1964, F 42,865
9 Claims. (Cl. 260—857)

ABSTRACT OF THE DISCLOSURE

Polyether ester amides are prepared by the reaction of a polyamide with an aromatic oxycarboxylic acid ester having the formula

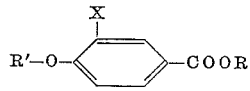

where X is H or oxyalkyl, R is alkyl or alkylol, and R' is H, alkylol, alkylol ether or alkylol ester. The preferred species is p-β-hydroxybenzoic acid alkyl ester.

---

The invention relates to polyether ester amides and to a process for their production by reacting polyamide with an aromatic oxycarboxylic acid ester or a condensation product thereof.

It is known to produce a polymer which can be drawn out into filaments by heating polyamide-forming compounds with polyester-forming compounds. Furthermore, polymers which can be drawn into threads are obtained by heating a mixture of diamine, a dibasic carboxylic acid and a glycol. It has furthermore been found that re-amidation and formation of a mixed polycondensate occurs when caprolactam polyamide is copolycondensed with polyhexamethylene adipamide. It has also already been proposed to mix and melt polycaprolactam with small quantities of polyethylene terephthalate to yield fine crystalline products.

A process for the production of new polyether ester amides has now been found, in which polyamides are heated with aromatic oxycarboxylic esters of the general formula

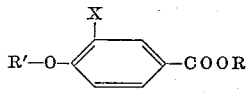

or the condensation products thereof, wherein X represents hydrogen or an oxyalkyl group, R' represents hydrogen, an alkylol, an alkylolether or an alkylol ester group and R represents an alkyl or an alkylol group, in vacuo at temperatures between 200° and 280° C. in the presence of catalysts, optionally with the addition of glycol terephthalate or other dicarboxylic acid glycol esters.

If the heating is for example carried out at a pressure of 0.1 to 3 mm. Hg, the polycondensation period lasts for 1 to 5 hours. The polyamides, which are used in quantities of 1 to 99% by weight based on the total polymer, are those which have solution viscosities of $\eta_{rel}$ 1.0 to 4.0 (determined in 1% solution in m-cresol in a capillary viscometer at 25° C.).

Examples of aromatic oxycarboxylic acid esters or their condensation products (precondensates) are the following p-oxy-benzoic acid esters:

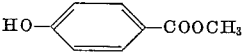

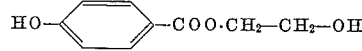

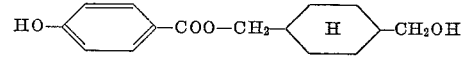

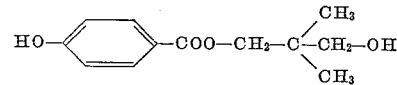

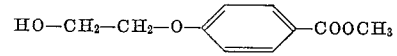

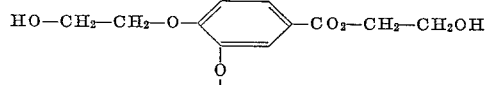

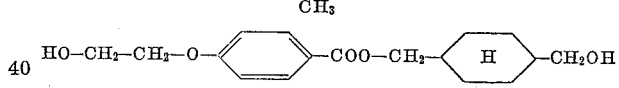

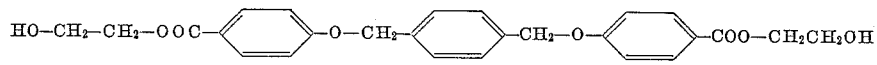

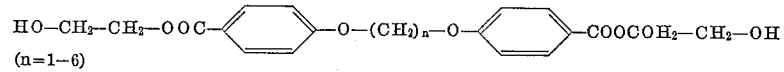
(n=1—6)

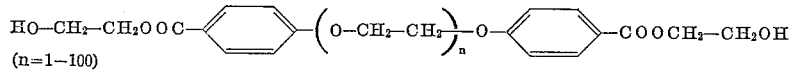
(n=1—100)

Polyamides which may be employed include polyamides of aminocarboxylic acid type (such as polycaprolactam and polyamino undecanoic acid) and polyamides obtained from diamines and dicarboxylic acids (such as from adipic acid and hexamethylene diamine). However, mixed polyamides can also be used. The polyamides may have a monomer content up to 20%.

As catalysts, it is possible to employ the known re-esterification and polycondensation catalysts, for example antimony trioxide, germanium dioxide, zinc acetyl acetonate, titanium compounds such as titanium tetraisobutylate, titanium oxalate and organic tin compounds.

The catalyst is added in quantities from 0.01 to 1% by weight, based on the total quantity of the components being used.

The mixed condensation is carried out by first of all mixing the components and then, after adding advantageously 0.1% by weight of a catalyst, based on the components introduced, effecting heating in a melt to temperatures between 200 and 280° C. in vacuo, advantageously at 0.1 to 0.3 mm.

The polyether ester amides obtained according to the process show no depression in melting point, regardless of the proportions of the components used. For example, the polyether ester amides of polycaprolactam and the precondensates of methyl-p-β-hydroxyethoxy benzoate show a constant melting point range, which is between 220 and 230° C. Furthermore, the melt viscosities of these said polyether ester amides are always above 2000 poises (at 240° C.), so that these products can be spun in excellent manner from the melt and thereafter can be stretched, it being possible to obtain breaking strengths up to 4.5 g./den. at 25 to 30% elongation. These polyester amides also show no re-formation or demixing with subsequent heating in vacuo.

The co-polycondensation of polycaprolactams with precondensates of methyl-p-β-hydroxyethoxy benzoate or monomeric methyl-p-β-hydroxyethoxy benzoate, or conversion of precondensates of caprolactam with methyl-p-β-hydroxyethyl benzoate and subsequent polymerisation with caprolactam polyamides according to the invention is all the more remarkable, since the other possibilities of the co-polycondensation, such as alkali high-speed polymerisation of caprolactam with methyl-p-hydroxyethoxy benzoate in the presence of LiH or Na (optionally also with N-acetylcaprolactam as co-catalyst) or conversion with ε-aminocaproic acid as starter or with water in an autoclave, does not lead to any results which can be usefully employed.

In particular, the co-polycondensation of methyl-p-β-hydroxyethoxy benzoate precondensates with polycaprolactam is of particular interest and in practice provides highly viscous, spinnable and high-melting compounds (independently of the precondensation) throughout the entire concentration range. With this aforementioned polycondensation, the choice of a suitable polycondensation catalyst is of high importance. The following compounds can for example be copolycondensed with polycaprolactam:

(a) Methyl-p-β-hydroxyethoxy benzoate (or precondensates with different quantities of glycol terephthalate), (b) p-Hydroxybenzoic acid glycol ester (or a precondensate thereof), or precondensates of p-hydroxybenzoic acid with glycol, (c) Glycol esters, cyclohexane-1,4-dimethanol esters and neopentylglycol esters of 1,2-bis-(4-carboxyphenoxy)-ethane or bis-(4-carboxyphenoxy)-p-xylylene.

As already mentioned the copolycondensation is effected by mixing the precondensates with polyamides (with the addition of a polycondensation catalyst in a quantity of 0.1% by weight, based on the precondensate concentration) at temperatures between 220 to 280° C. in a vacuum of 0.1 to 3 mm. and maintaining the optimum ploycondensation temperature for 1 to 5 hours. Depending on the proportions of the components and the period of polycondensation, the polyether ester amides are white to light brown in colour and can be spun directly from the autoclave. Independently of the nature of the precondensate, the following viscosity values are obtained with the production of polyether ester amides from a given polycaprolactam (for example with a viscosity of $\eta_{rel}=2.5$) and a given precondensate concentration, for example 20% by weight of precondensate of methyl-p-β-hydroxyethoxy benzoate, and after a polycondensation period of 1, 2 and 3 hours, respectively:

1 hour: $\eta_{rel}=1.9$–2.0,
2 hours: $\eta_{rel}=2.0$–2.2,
3 hours: $\eta_{rel}=2.2$–2.8.

Stable polyether ester amides are obtained by the polycondensation in accordance with the invention. Since neither re-formation is to be observed and only a certain crystallite melting point is found in the differential thermoanalysis diagram, nor are any indications of a polyester peak to be seen, the aromatic oxycarboxylic acids (or their precondensates) are incorporated in the polyamides. The polyether ester amides can be satisfactorily spun and stretched, high polyester concentrations making necessary a heat stretching or drawing at a mean drawing ratio (1:3.33).

The filaments obtained show a different shrinkage, a better dyeing capacity and can for example be used for the manufacture of spontaneously crimped fibres (two-component fibres).

The polyether ester amides of this invention and the process for their manufacture are illustrated in the following examples. It is to be understood that these examples are not intended in any way to limit the scope of the invention.

Example 1

1000 g. of methyl-p-β-hydroxyethoxy benzoate are precondensed in an autoclave with 700 mg. of zinc acetylacetonate (0.07% by weight) for 5½ hours at temperatures of from 180 to 250° C. in a nitrogen atmosphere (2 hours at 200° C., 1 hour at 220° C. and 2.5 hours at 250° C.) until 158 ml. of methanol are split off. 400 g. of the aforementioned precondensate are thoroughly mixed with 1600 g. of polycaprolactam shreds ($\eta_{rel}=2.57$) and 500 mg. of germanium dioxide and melted in a 5-litre autoclave at 220° C. under a nitrogen atmosphere and heated in 40 minutes to 260° C. while simultaneously lowering the pressure to 5 mm. Hg. This temperature is maintained for 2 hours and the pressure lowered still further to 1 mm. Hg. The homogeneous polyester amide is expressed into water, thoroughly dried, ground and thereafter spun.

Crystallite melting point: 223° C.
$\eta_{rel}$ (1% solution in m-cresol): 2.05.
Methanol extract: 2.74%.

Example 2

The experiment is carried out as in Example 1, only with 40% by weight of the previously mentioned precondensate: 1200 g. of polycaprolactam shreds ($\eta_{rel}=2.5$), 800 g. of precondensate and 1 g. of $GeO_2$ are melted in an autoclave at 220° C. and heated for 3 hours at 260° C. under a vacuum of 1.6 mm. Hg.

Crystallite melting point: 221–223° C.
$\eta_{rel}$: 1.89.
Methanol extract: 3.14%.

Example 3

In a 2-litre autoclave, 950 g. of methyl-p-β-hydroxyethoxy benzoate, and 50 mg. of glycol terephthalate are heated with 700 mg. of zinc acetylacetonate and 700 mg. of $GeO_2$ for 6 hours in a nitrogen atmosphere to temperatures of 180 to 250° C. (2 hours at 180–200° C., 1 hour at 220° C., 3 hours at 220–250° C.) until 150 ml. of methanol are split off. Solidification point=190–195° C.

$\eta_{rel}$: 1.11
Methanol extract: 20%.

1200 g. of polycaprolactam shreds ($\eta_{rel}$: 2.57) were well mixed with 300 g. of precondensate and 370 mg. of $GeO_2$ and polycondensed for a total of 4 hours at 220–260° C. in a vacuum of 1 mm. Hg, a polymer being obtained having a crystallite melting point of 220° C., $\eta_{rel}=2.79$,
Methanol extract: 2.63%.

If the same reaction is carried out with 70% by weight of the precondensate referred to under Example 3 (1050 g. of precondensate, 450 g. of polycaprolactam shreds, 1 g. of $GeO_2$) for 5½ hours at 220–270° C./0.6 mm. Hg, then a polycondensate which is yellow in colour is obtained, having a melting point of 205–206° C. and $\eta_{rel}$: 1.91.

Example 4

1000 g. of monoglycol-p-hydroxy benzoate, 700 mg. of LiH and 700 mg. of GeO₂ and precondensed in a rotary evaporator in a nitrogen atmosphere for 7 hours at temperatures between 200 and 250° C. (2 hours from 200–250° C., 5 hours at 245° C.), 218 ml. of a mixture of glycol and phenol being obtained.

The precondensate is thoroughly ground and has a melting point of 192° C. ($\eta_{rel}$: 1.12, methanol extract: 23%).

1600 g. of polycaprolactam shreds ($\eta_{rel}$: 2.50) are well mixed with 400 g. of the aforesaid precondensate and 500 mg. of GeO₂, melted under nitrogen and heated for 2 hours to 260° C. at a pressure of 1 mm. The polymer has a melting point of 220–221° C., $\eta_{rel}$: 2.14, and can be spun to form filaments with a breaking strength of 4 g./den. at 37% elongation (cold drawing with 1:3.32).

Example 5

In a polymerization vessel equipped with a stirrer device, nitrogen inlet pipe and cooling trap 20 g. of polycaprolactam shreds, $\eta_{rel}$:2.59, are polycondensed with 5 g. of glycol ester of bis-(4-carboxyphenoxy)-p-xylylene and 25 mg. of GeO₂ for 3 hours at temperatures from 220–260° C./0.1 mm., a yellowish coloured polymer being obtained having a crystallite melting point of 221° C., $\eta_{rel}$=2.90, methanol extract: 0.86%.

Example 6

In a thin-film evaporator, 20 g. of polycaprolactam ($\eta_{rel}$: 2.57) and 5 g. of cyclohexane-1,4-dimethanol ester of 1,2-bis-(carboxyphenoxy)-ethane are melted with 25 mg. of GeO₂ in a nitrogen atmosphere at 230° C. and after applying a vacuum, polycondensed for 1 hour at 260° C./0.14 mm. Hg.

Crystallite melting point: 218–220° C.
$\eta_{rel}$: 2.79
Methanol extract: 1%.

Example 7

In the same way (see Example 6), 20 g. of polycaprolactam shreds ($\eta_{rel}$=1.57) are polycondensed with 5 g. of glycol ester of 1,2-bis-(4-carboxyphenoxy)-ethane, a polymer being obtained with the melting point 230–235° C., $\eta_{rel}$: 2.59, and methanol extract: 5.06%.

Example 8

In an autoclave, 300 g. of polycaprolactam shreds ($\eta_{rel}$=2.57) are melted with 200 g. of glycol terephthalate, 200 g. of zinc acetylacetonate and 200 mg. of GeO₂ at 230° C. and polycondensed for 1 hour at 260° C./0.5 mm. Hg. Melting point: 229–230° C., $\eta_{rel}$=2.26.

Example 9

In a polymerization vessel provided with a stirrer device, nitrogen inlet pipe and cooling trap 40 g. of a polyamide ($\eta_{rel}$=2.59) and 10 g. of a precondensate of methyl-p-β-hydroxyethoxy benzoate are polycondensed with 5% by weight of the glycol ester of 1,2-bis-(4-carboxyphenoxy)-ethane and 100 mg. of zinc acetylacetonate for 1½ hours at 260° C./0.3 mm. Hg. Melting point: 220–221° C., $\eta_{rel}$: 2.39.

Example 10

In a similar manner to Example 9, 40 g. of a polyamide ($\eta_{rel}$=2.55), are polycondensed with 10 g. of the precondensate referred to under Example 9 and 5 mg. of GeO₂ for 90 minutes at 260° C./0.3 mm. Hg, a product being obtained with the $\eta_{rel}$=2.15 and melting point: 184–185° C.

Example 11

In a polymerization vessel, 20 g. of ε-aminocaproic acid are initially reacted for 30 minutes at 220° C. with 5 g. of the precondensate referred to under Example 3. After evolution of steam has ceased, precondensation takes place for 3 hours at 260° C., 25 mg. of GeO₂ being added as polycondensation catalyst and polycondensation taking place for 6 hours at 260° C./0.14 mm. Hg. The yellowish-coloured polymer has a ($\eta_{rel}$=2.12) 1% solution in m-cresol and a crystallite melting point of 210–215° C.

Example 12

In a pressure-type autoclave, 450 g. of caprolactam are precondensed with 50 g. of a precondensate mentioned under Example 3, as well as 10 ml. of water, 100 mg. of GeO₂ and 100 mg. of zinc acetylacetonate, for 4 hours under natural vapour pressure at 260° C., and then further heated for 3 hours with the introduction of a stream of nitrogen under pressure. This precondensate is polycondensed with 2 kg. of Perlon shreds and 1 g. of GeO₂ for 2 hours at 260° C./0.1 mm. Melting point: 225° C., $\eta_{rel}$=2.40.

Example 13

In a rotary evaporator, 69 g. of p-hydroxybenzoic acid, 70 ml. of glycol and 50 mg. of zinc acetylacetonate, as well as 50 mg. of GeO₂, are heated in a nitrogen atmosphere for 6 hours to temperatures of 200–250° C., until 10 ml. of a mixture of phenol and water is split off. After removing the excess glycol, 5 g. of the precondensate are polycondensed with 20 g. of polycaprolactam shreds ($\eta_{rel}$=2.60) and also 25 mg. of GeO₂ for 5 hours at 260° C./0.2 mm., a white, viscous polycondensate being obtained. Melting point: 221°, $\eta_{rel}$=2.19.

It is obvious that many modifications and different embodiments can be made without departing from the scope of this invention.

What we claim is:

1. A polyether ester amide comprised of a reaction product of a polyamide having a solution viscosity $\eta_{rel}$ of between 1.0 and 4.0 and an oxycarboxylic acid ester compound selected from the group consisting of an aromatic oxycarboxylic acid ester and a condensation product thereof, said aromatic oxycarboxylic acid ester having the formula

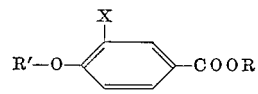

wherein X is a member of the group consisting of hydrogen and an oxyalkyl group, R represents a member of the group consisting of an alkyl and an alkylol group and R' is a member of the group consisting of hydrogen, an alkylol, an alkylol ether and an alkylol ester group.

2. The polyether ester amide according to claim 1, wherein said polyamide is polycaprolactam.

3. The polyether ester amide according to claim 1, wherein said aromatic oxycarboxylic acid ester is a p-β-hydroxybenzoic alkyl ester.

4. The polyether ester amide according to claim 1, wherein said aromatic oxycarboxylic acid ester is a precondensate of a p-β-hydroxybenzoic acid alkyl ester.

5. A polyether ester amide comprised of a reaction product of a polyamide having a solution viscosity $\eta_{rel}$ of between 1.0 and 4.0; a glycol terephthalate and an oxycarboxylic acid compound selected from the group of an aromatic oxycarboxylic acid ester and a condensation product thereof, said aromatic oxycarboxylic acid ester having the formula

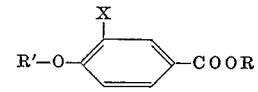

wherein X is a member of the group consisting of hydrogen and an oxyalkyl group, R represents a member of the group consisting of an alkyl and an alkylol group and R' is a member of the group consisting of hydrogen, an alkylol, an alkylol ether and an alkylol ester group.

6. A process of producing spinnable polyether ester amides, which comprises reacting a polyamide with an oxycarboxylic acid ester compound selected from the group consisting of an aromatic oxycarboxylic acid ester and a condensation product thereof, said aromatic oxycarboxylic acid ester having the formula

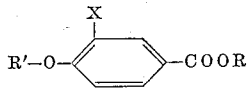

wherein X represents a member of the group consisting of hydrogen and an oxyalkyl group, R' represents a member of the group consisting of hydrogen, an alkylol, an alkylol ether and an alkylol ester group and R represents a member of the group consisting of an alkyl and an alkylol group, said reacting is carried out in the presence of a catalyst under vacuum at temperatures of between 200 and 280° C.

7. The process according to claim 6, wherein said polyamide is a polycaprolactam having solution viscosity $\eta_{rel}$ of between 1.0 and 4.0.

8. The process according to claim 6, wherein said oxycarboxylic acid ester compound is a p-β-hydroxybenzoic acid alkyl ester.

9. A process of producing spinnable polyether ester amides, which comprises reacting a polyamide with an oxycarboxylic acid ester compound selected from the group consisting of an aromatic oxycarboxylic acid ester and a condensation product thereof, said aromatic oxycarboxylic acid ester having the formula

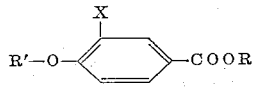

wherein X represents hydrogen and an oxyalkyl group, R' represents a member of the group consisting of hydrogen, an alkylol, an alkylol ether and an alkylol ester group and R represents a member of the group consisting of an alkyl and an alkylol group, said reacting is carried out in the presence of a catalyst and of glycol terephthalate under vacuum at temperatures of between 200° and 280° C.

References Cited
UNITED STATES PATENTS
3,161,608  12/1964  Caldwell _____ 260—47

MURRAY TILLMAN, *Primary Examiner.*

PAUL LIEBERMAN, *Assistant Examiner.*